No. 865,230. PATENTED SEPT. 3, 1907.
H. H. BOWLAND.
CANOPY BRACKET.
APPLICATION FILED APR. 12, 1907.
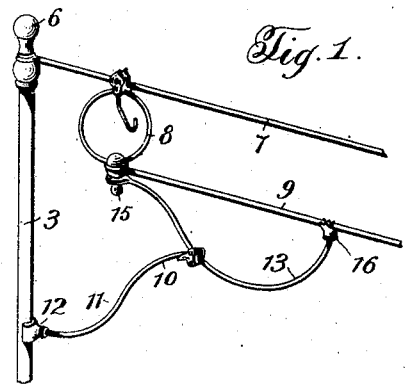
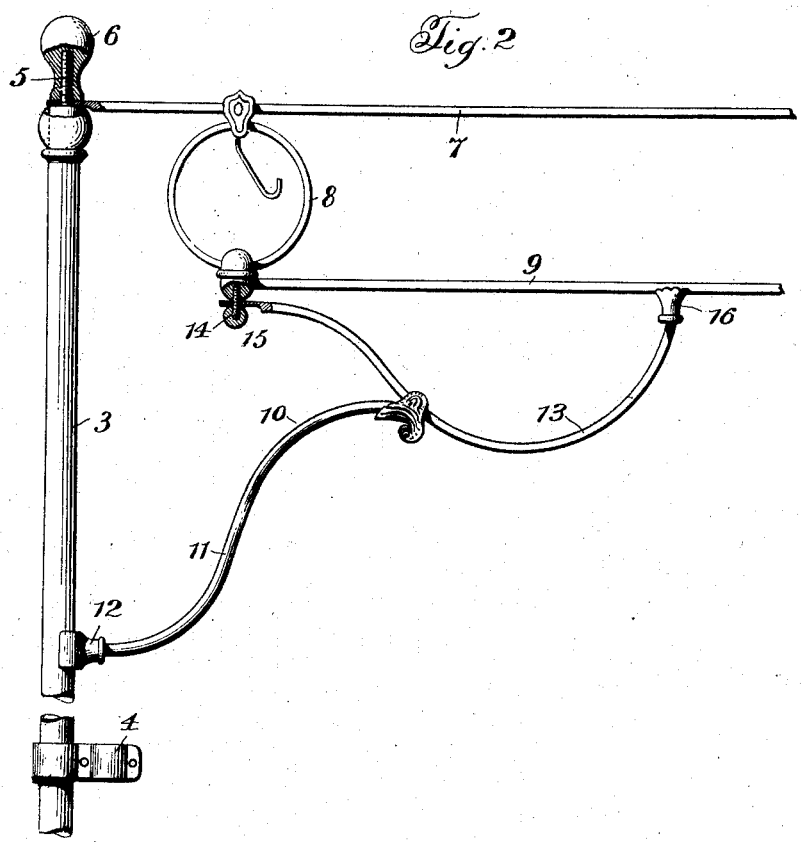
Witnesses:
Jas E. Hutchinson
E. E. Daly
Inventor:
Homer H. Bowland,
By Hal E. Burnham, Attorney

UNITED STATES PATENT OFFICE.

HOMER H. BOWLAND, OF CHICAGO, ILLINOIS.

CANOPY-BRACKET.

No. 865,230.

Specification of Letters Patent.

Patented Sept. 3, 1907.

Application filed April 12, 1907. Serial No. 367,793.

*To all whom it may concern:*

Be it known that I, HOMER H. BOWLAND, a citizen of the United States, residing at Chicago, in the county of Cook and State of Illinois, have invented certain new and useful Improvements in Canopy-Brackets, of which the following is a specification, reference being had therein to the accompanying drawing.

This invention relates to canopy-supports for bedsteads, and it pertains particularly to the brackets which support the canopy-frame on the uprights attached to or forming a part of the head-posts of a bedstead.

Heretofore, it has been the common practice to attach the upper part of the bracket at or near the top of the head-post or other upright.

This invention provides a bracket which is attached directly to the canopy-frame, and is held firmly at one point of attachment to the bed-uprights.

An embodiment of the invention is disclosed, for purposes of illustration, in the accompanying drawings, forming part hereof, wherein like reference-characters refer to corresponding parts in the several views, and of which—

Figure 1 is a perspective view of a portion of a canopy-frame including the invention; and Fig. 2 is an enlarged detail view of the bracket structure.

Having more particular reference to the drawings, 3 designates uprights which are attachable to a bedstead by clamps 4. The upper end of each upright is formed with a threaded shank 5, which is received by the threaded socket of a top 6.

The canopy-frame includes a rod 7 extending from each upright 3 and held in connection therewith by shank 5 extending through an aperture in the rod and by top 6 which clamps the rod. Depending from rod 7 and attached thereto at a point somewhat removed from the upright is a connection 8, to which is attached an approximately parallel rod 9, the inner end of said rod being somewhat removed from the upright.

Bracket 10 is attached to rod 9 and contacts with upright 3 to support the canopy-frame. The bracket 10 comprises a brace 11, having a socket 12 arranged to seat against upright 3, and a downwardly and upwardly curved arm 13 attached to brace 11 and arranged to be detachably secured to connection 8. Arm 13 at the inner end is formed with an aperture through which is passed a threaded-shank 14 depending from connection 8, and is held thereon by a head 15. The outer end of arm 13 is formed with a socket 16 in which rod 9 rests.

By employment of this invention, a bracket of simple and effective finish is provided which firmly connects to the top of the post only without necessity of forming apertures in or otherwise marring the post.

Having thus described my invention, what I claim as new, and desire to secure by Letters Patent, is—

The combination with a bed-upright, of an upper rod extending laterally therefrom and having its inner end removably connected thereto, a connection depending from said upper rod at a point somewhat removed from said upright, a lower rod substantially parallel with said upper rod and having its inner end attached to said connection, a member having its inner end removably attached to said connection and curving downwardly and upwardly to the other end where it is formed with a socket for engagement with said lower rod, and a brace attached to said curved member and having a free end formed with a socket arranged to engage said upright.

In testimony whereof I affix my signature in presence of two witnesses.

HOMER H. BOWLAND.

Witnesses:
 GEORGE T. HICKS,
 A. H. DRESSEL.